US010267137B2

(12) United States Patent
May et al.

(10) Patent No.: US 10,267,137 B2
(45) Date of Patent: Apr. 23, 2019

(54) SELF-GUIDED GEOSTEERING ASSEMBLY AND METHOD FOR OPTIMIZING WELL PLACEMENT AND QUALITY

(71) Applicant: Landmark Graphics Corporation, Houston, TX (US)

(72) Inventors: Michael May, The Woodlands, TX (US); Ronald Glen Dusterhoft, Katy, TX (US); Tom Tesoriero, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 400 days.

(21) Appl. No.: 14/430,812

(22) PCT Filed: Sep. 28, 2012

(86) PCT No.: PCT/US2012/057853
§ 371 (c)(1),
(2) Date: Mar. 24, 2015

(87) PCT Pub. No.: WO2014/051612
PCT Pub. Date: Apr. 3, 2014

(65) Prior Publication Data
US 2015/0267525 A1      Sep. 24, 2015

(51) Int. Cl.
*G05B 13/04* (2006.01)
*E21B 44/00* (2006.01)
(Continued)

(52) U.S. Cl.
CPC .............. *E21B 44/005* (2013.01); *E21B 7/04* (2013.01); *E21B 47/024* (2013.01); *E21B 49/00* (2013.01); *G05B 17/02* (2013.01)

(58) Field of Classification Search
CPC ...... G05B 13/042; G01V 3/38; E21B 47/022; E21B 7/04; E21B 44/00; E21B 47/026; E21B 47/06; E21B 7/046; G06F 19/3406
See application file for complete search history.

(56) References Cited

U.S. PATENT DOCUMENTS 4,733,733 A * 3/1988 Bradley .................... E21B 7/04
                                                              175/61
4,962,490 A   10/1990 Lyle et al.
(Continued)

FOREIGN PATENT DOCUMENTS

| RU | 37766 U1 | 5/2004 |
| RU | 2436947 C2 | 12/2011 |
| WO | WO-03076969 A2 | 9/2003 |

OTHER PUBLICATIONS

The Federal Institue of Industrial Property, Office Action, dated May 24, 2016, 7 pages, Russian Application No. 2015109295, Russia.
(Continued)

*Primary Examiner* — Darrin D Dunn

(57) ABSTRACT

A self-guided geosteering assembly having an on-board, automated guidance system that incorporates a detailed subsurface earth model and well path to geosteer the assembly along a formation. While advancing along the formation, the guidance system continually monitors data related to formation characteristics and the formation/tool location, compares the data to the earth model and well path, and adjusts the direction of the assembly accordingly. In addition, the data may be utilized to update the earth model in real-time.

21 Claims, 2 Drawing Sheets

(51) Int. Cl.
  *E21B 7/04* (2006.01)
  *E21B 47/024* (2006.01)
  *E21B 49/00* (2006.01)
  *G05B 17/02* (2006.01)

(56) References Cited

U.S. PATENT DOCUMENTS

| | | | | |
|---|---|---|---|---|
| 6,176,323 | B1* | 1/2001 | Weirich | E21B 21/08 175/40 |
| 6,206,108 | B1* | 3/2001 | MacDonald | E21B 44/00 175/24 |
| 6,272,434 | B1* | 8/2001 | Wisler | E21B 7/068 702/11 |
| 6,766,254 | B1* | 7/2004 | Bradford | E21B 44/00 367/73 |
| 7,063,174 | B2* | 6/2006 | Chemali | E21B 44/00 175/48 |
| 7,093,672 | B2* | 8/2006 | Seydoux | E21B 7/04 175/24 |
| 7,269,515 | B2* | 9/2007 | Tabarovsky | E21B 47/10 702/7 |
| 7,448,262 | B2* | 11/2008 | Sheng | E21B 49/008 73/152.05 |
| 7,463,035 | B2 | 12/2008 | Merchant et al. | |
| 7,874,357 | B2* | 1/2011 | Jalali | E21B 47/06 166/250.01 |
| 8,442,769 | B2* | 5/2013 | Phillips | E21B 47/022 166/241.4 |
| 8,463,549 | B1* | 6/2013 | Selman | E21B 44/00 702/11 |
| 8,645,571 | B2* | 2/2014 | Downton | E21B 47/12 340/853.3 |
| 8,705,318 | B2* | 4/2014 | Zheng | E21B 47/00 175/24 |
| 8,783,382 | B2* | 7/2014 | Ignova | E21B 7/04 175/61 |
| 9,097,096 | B1* | 8/2015 | Selman | E21B 44/00 |
| 9,273,517 | B2* | 3/2016 | Tchakarov | E21B 7/04 |
| 9,638,830 | B2* | 5/2017 | Meyer | G01V 99/005 |
| 2003/0168257 | A1* | 9/2003 | Aldred | E21B 44/00 175/24 |
| 2003/0229449 | A1 | 12/2003 | Merchant et al. | |
| 2004/0050590 | A1* | 3/2004 | Pirovolou | E21B 7/04 175/61 |
| 2004/0190374 | A1 | 9/2004 | Alft et al. | |
| 2004/0245016 | A1* | 12/2004 | Chemali | E21B 44/00 175/25 |
| 2005/0171698 | A1* | 8/2005 | Sung | E21B 49/00 702/9 |
| 2005/0211468 | A1* | 9/2005 | Veeningen | E21B 7/04 175/24 |
| 2006/0090934 | A1* | 5/2006 | Williams | E21B 7/04 175/45 |
| 2008/0179094 | A1* | 7/2008 | Repin | E21B 44/00 175/50 |
| 2008/0208477 | A1* | 8/2008 | Kelfoun | E21B 7/046 702/11 |
| 2008/0314641 | A1* | 12/2008 | McClard | E21B 7/04 175/57 |
| 2009/0157367 | A1* | 6/2009 | Meyer | E21B 7/04 703/10 |
| 2009/0198447 | A1* | 8/2009 | Legendre | G01V 1/50 702/11 |
| 2009/0229819 | A1* | 9/2009 | Repin | E21B 47/00 166/250.01 |
| 2009/0288881 | A1* | 11/2009 | Mullins | E21B 7/04 175/50 |
| 2009/0299714 | A1 | 12/2009 | Kelkar et al. | |
| 2009/0302851 | A1 | 12/2009 | Bittar et al. | |
| 2010/0122847 | A1* | 5/2010 | Xia | G01V 1/40 175/41 |
| 2010/0250207 | A1* | 9/2010 | Rodney | G01V 1/48 703/2 |
| 2011/0031015 | A1* | 2/2011 | Downton | E21B 47/12 175/27 |
| 2011/0088895 | A1 | 4/2011 | Pop et al. | |
| 2011/0132662 | A1* | 6/2011 | Dennis | E21B 47/042 175/1 |
| 2011/0132663 | A1* | 6/2011 | Johnston | E21B 49/005 175/24 |
| 2011/0153296 | A1* | 6/2011 | Sadlier | E21B 44/00 703/7 |
| 2011/0172976 | A1* | 7/2011 | Budiman | E21B 47/04 703/2 |
| 2012/0046868 | A1* | 2/2012 | Tchakarov | E21B 7/04 702/9 |
| 2012/0285701 | A1* | 11/2012 | Cheng | E21B 43/30 166/369 |
| 2013/0140037 | A1* | 6/2013 | Sequeira, Jr. | E21B 7/04 166/369 |
| 2013/0144531 | A1* | 6/2013 | Johnston | E21B 44/00 702/9 |
| 2013/0248250 | A1* | 9/2013 | Bittar | E21B 47/00 175/45 |
| 2013/0282349 | A1* | 10/2013 | Gorell | G01V 99/00 703/10 |
| 2013/0333879 | A1* | 12/2013 | Rasheed | E21B 10/32 166/250.1 |
| 2014/0076543 | A1* | 3/2014 | Ejofodomi | G01V 1/306 166/250.1 |
| 2014/0172303 | A1* | 6/2014 | Ibrahim | E21B 47/00 702/6 |
| 2014/0214325 | A1* | 7/2014 | Wessling | E21B 47/06 702/11 |
| 2015/0047902 | A1* | 2/2015 | Tang | G01V 3/26 175/45 |
| 2015/0186567 | A1* | 7/2015 | Wu | E21B 47/0002 703/2 |
| 2015/0233214 | A1* | 8/2015 | Dusterhoft | E21B 41/0092 703/10 |
| 2015/0361725 | A1* | 12/2015 | Ignova | E21B 7/04 175/27 |
| 2016/0047207 | A1* | 2/2016 | Lecerf | G06G 7/50 703/10 |
| 2016/0123134 | A1* | 5/2016 | Viens | E21B 7/04 175/45 |
| 2016/0130878 | A1* | 5/2016 | Cobern | E21B 7/04 175/25 |
| 2016/0186551 | A1* | 6/2016 | Dykstra | E21B 47/02 175/24 |
| 2016/0266268 | A1* | 9/2016 | Amer | G01V 1/30 |
| 2016/0327680 | A1* | 11/2016 | Jain | E21B 45/00 |
| 2017/0058656 | A1* | 3/2017 | Benson | E21B 44/00 |
| 2017/0152739 | A1* | 6/2017 | Benson | E21B 47/04 |

OTHER PUBLICATIONS

The Federal Institue of Industrial Property, Office Action Translation, dated May 24, 2016, 5 pages, Russian Application No. 2015109295, Russia.

European Patent Office, Supplementary European Search Report, dated Aug. 23, 2016, 6 pages, Europe.

Search Report and Written Opinion of the International Searching Authority, dated Jan. 23, 2013, 10 pages; United States International Searching Authority.

Shepherd, 3-D Geocellular Modeling, Oil Field Production Geology, 2009, 1 page, The American Association of Petroleum Geologists.

* cited by examiner

SELF-GUIDED GEOSTEERING ASSEMBLY AND METHOD FOR OPTIMIZING WELL PLACEMENT AND QUALITY

The present application is a U.S. National Stage patent application of International Patent Application No. PCT/US2012/057853, filed on Sep. 28, 2012, the benefit of which is claimed and the disclosure of which is incorporated herein by reference in its entirety.

FIELD OF THE INVENTION

The present invention generally relates to geosteering and, more particularly, to a self-guided geosteering assembly to optimize the placement and quality of wellbores.

BACKGROUND

In the current business environment within North America, the majority of drilling rigs have shifted away from vertical to horizontal well drilling in order to more effectively exploit low quality shale reservoirs. Such reservoirs have extreme vertical heterogeneity, with individual vertical layers ranging in thickness from tenths of an inch to a few inches, while horizontally the reservoir tends to remain quite consistent. In this environment, placement of the wellbore within the reservoir can be the difference between a successful well and an economic failure. Therefore, successful stimulation of these reservoirs is paramount to achieve economic production rates.

However, successful stimulation first requires optimal placement of the wellbore along the vertical strata. Locating the wellbore in a soft, ductile and, thus, unproductive region can make stimulation and long term production very difficult due to the high fracture initiation pressures and loss of fracture conductivity under production conditions. Also, stress transition regions can have a significant impact on fracture growth, thus making it difficult to contact an adequate amount of the reservoir. Thus, the goal is to locate the wellbore in a portion of the shale reservoir that will maximize the effectiveness of a stimulation treatment. Such a desired portion would be in close proximity to the stored hydrocarbon, contain brittle rock that can be easily stimulated with fracturing, comprise a simple stress regime that will allow adequate fracture growth, and have a high natural fracture density.

For a number of reasons, conventional geosteering approaches have had limited success in locating the wellbore within the desired high-producing portions of the reservoir. First, the drilling assembly is essentially driven blind, as engineers and geologists at the surface rely on down hole sensors and telemetry to provide data about the rock quality around the bit. Once the data is received at the surface, the drilling team must then interpret the data, and adjust the assembly accordingly—a very time consuming process. Second, the amount of downhole data that can be transmitted back to the surface using current telemetry methods is severely limited given the roughly 100 KB maximum data transmission rate of current telemetry methods. This, in addition to the shear distance from the surface to the drill bit, often results in a drastic lag time in the geosteering response.

Third, given the slow data transmission rate, the drilling team often is forced to wait until the drill bit actually contacts a surface before taking corrective action. As a result of these lag inducing factors, the wellbores are often tortuous and fail to remain in the optimal section of the reservoir. Fourth, in very layered reservoirs, current geosteering approaches simply lack the precision required to achieve the accuracy necessary for optimal wellbore placement. Lastly, conventional geosteering assemblies are not forward-looking; instead, they simply react to the received downhole data.

Accordingly, in view of these disadvantages, there is a need in the art for a highly-responsive, forward-looking and precise geosteering assembly, thus resulting in optimal placement and quality of the wellbore.

DESCRIPTION OF ILLUSTRATIVE EMBODIMENTS

Illustrative embodiments and related methodologies of the present invention are described below as they might be employed in a self-guided geosteering assembly and method to optimize the placement and quality of wellbores. In the interest of clarity, not all features of an actual implementation or methodology are described in this specification. In addition, the "exemplary" embodiments described herein refer to examples of the disclosed invention. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
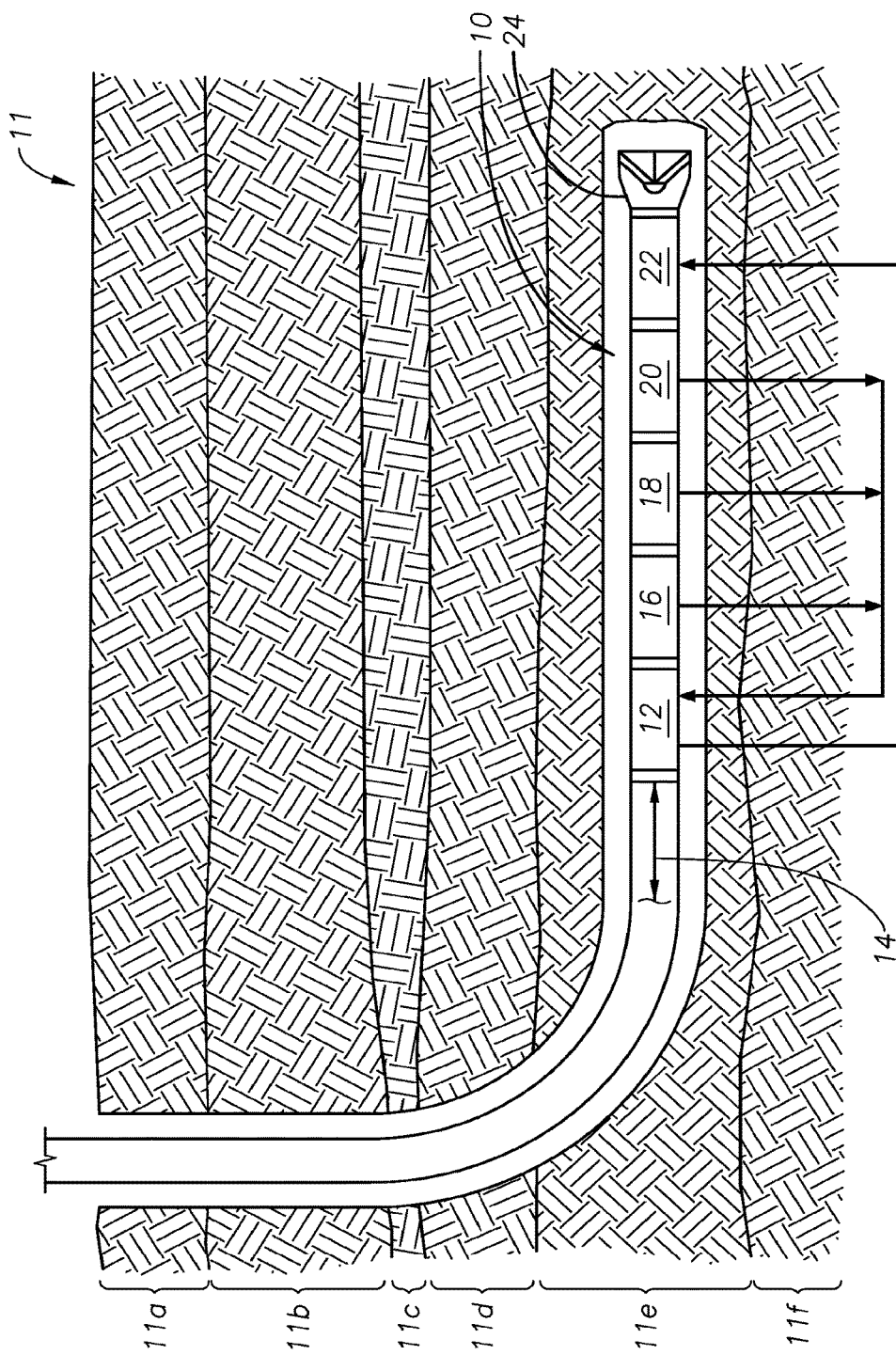
FIG. 1 illustrates a self-guided geosteering assembly according to an exemplary embodiment of the present invention.

FIG. 1 illustrates a self-guided geosteering ("SGG") assembly 10 according to an exemplary embodiment of the present invention. As described herein, SGG assembly 10 is a smart bottom hole assembly that utilizes on-board circuitry, computer algorithms and components to geosteer SGG assembly 10 in real-time, in addition to transmitting data back to a surface location. To achieve this, SGG assembly 10 utilizes a programmed well trajectory (i.e., well path) plotted along a detailed earth model in order to target a specific stratigraphic portion of the reservoir. As SGG assembly 10 advances downhole along the desired well path, real-time data related to the surrounding reservoir characteristics and assembly location is analyzed by an on-board computer guidance system which, in turn, instructs a directional controller to adjust the direction of SGG assembly 10 accordingly. As such, SGG assembly 10 self guides itself through use of the earth model and real-time feedback from assembly components, thereby ensuring SGG assembly 10 maintains the correct well trajectory along the desired stratigraphic portion of the reservoir.

In certain exemplary embodiments of the present invention, SGG assembly 10 is used in conjunction with a drill string. As will be described in more detail below, SGG assembly 10 comprises a CPU guidance system 12, stratigraphic sensing system 16, earth locator 18, imaging tool 20, directional controller 22 and drill bit 24, all of which are electrically coupled to one another via a system bus. As such, SGG assembly 10 collects and analyzes data regarding the physical wellbore location, stratigraphic well location, assembly location and stratigraphic characteristics, in order to control the well path and/or communicate the data back to the surface in real-time. As understood in the art, the physical wellbore location refers to the location within the earth model based on location parameters such as, for example, true vertical depth, horizontal displacement, etc., while stratigraphic well location refers to the location within the earth model in relation to a specific layers or markers along the formation.

Still referring to the exemplary embodiment of FIG. 1, SGG assembly 10 is shown advancing along a lateral section of a formation 11. Formation 11 includes a series of stratigraphic layers 11a-f that illustrate the extreme heterogeneity in the vertical direction with significant horizontal homogeneous continuity. As will be described in more detail below, stratigraphic layer 11e has been identified as the targeted layer. Nevertheless, SGG assembly 10 includes a CPU guidance system 12 which comprises one or more processors and related circuitry to control the geosteering operations of SGG assembly 10, as described herein. CPU guidance system 12 also comprises a computer-readable storage (not shown) to store the data necessary to achieve the functions of the present invention. Also, software instructions executable by the processor for implementing geosteering functions in accordance with the exemplary embodiments described herein, may be stored in the computer-readable storage or some other computer-readable medium located within SGG assembly 10. CPU guidance system 12 also includes a communication module that enables bi-directional communication between CPU guidance system 12 and other on-board components, as well as surface systems, via a link 14. These and other aspects of the computer architecture of CPU guidance system 12 necessary to achieve the exemplary features of the present invention would be readily understood by those ordinarily skilled in the art having the benefit of this disclosure.

CPU guidance system 12 comprises an earth modeling module (not shown) that enables CPU guidance system 12 to define and analyze stratigraphic characteristics, reservoir targets and markers, tool location and wellplans, thus enabling geosteering of SGG assembly 10. The earth modeling module further incorporates significant amounts of data including, for example, seismic, well log, core and basin data to construct comprehensive geocellular earth models that describe the target reservoir with sufficient detail to create a detailed wellplan. In this exemplary embodiment, the earth model is pre-programmed into CPU guidance system 12 prior to deployment, thus enabling SGG assembly 10 to adjust the well trajectory during drilling in order to stay within the desired stratigraphic layer. However, in an alternative embodiment, the earth model may be transmitted to CPU guidance system 12 from the surface via link 14, or updated in real-time based upon reservoir and location data received from sensors on-board SGG assembly 10 during drilling or other downhole operations.

Through utilization of the earth modeling module, CPU guidance system 12 thereby provides well planning and subsurface stratigraphic visualization including, for example, geo science interpretation, petroleum system modeling, geochemical analysis, stratigraphic gridding, facies and petrophysical property modeling. In addition, CPU guidance system 12 models well paths, as well as cross-sectional paths based upon the facies and porosity data as determined by downhole logging tools. Exemplary earth modeling platforms utilized by CPU guidance system 12 include, for example, DecisionSpace®, which is commercially available through the Assignee of the present invention, Landmark Graphics Corporation of Houston, Tex. However, those ordinarily skilled in the art having the benefit of this disclosure realize a variety of other earth modeling platforms may also be utilized within the earth modeling module.

SGG assembly 10 also includes a stratigraphic sensing system 16 that utilizes various sensors to determine the stratigraphic location of SGG assembly 10 within formation 11 and characteristics of the formation surrounding SGG assembly 10 in order to maintain the well path along the correct stratigraphic points in the reservoir. To do so, stratigraphic sensing system 16 identifies stratigraphic layers by their properties which may include mineralogy, strength, brittleness, fluid saturations, porosity, density etc. The sensors utilized by stratigraphic sensing system 16 are designed to keep the well within the desired stratigraphic layer that has been identified as the best wellbore target from a completion and production perspective (i.e., target well path modeled within the earth modeling module on-board CPU guidance system 12).

As would be understood by those ordinarily skilled in the art having the benefit of this disclosure, there are a variety of sensors that could be utilized by stratigraphic sensing system 16. For example, such sensing devices may include optical, acoustic, sonic, resistivity, magnetic resonance or nuclear based sensors. Upon determination of the formation and/or location data, stratigraphic sensing system 16 transmits the data back to CPU guidance system 12 to provide CPU guidance system 12 the data necessary to assist in determining the location of SGG assembly 10 within the formation and the ensure the well path remains on target. As such, the stratigraphic sensors are utilized by CPU guidance system 12 to identify the stratigraphic location of SGG assembly 10, which is then compared to the earth model to verify that the well trajectory is on target.

Still referring to FIG. 1, SGG assembly 10 also includes an earth locator 18 that determines the physical location of SGG assembly 10. More specifically, earth locator 18 determines where SGG assembly 10 has traveled and where it is spatially within formation 11. To do so, this exemplary embodiment of earth locator 18 takes readings at multiple points along the wellbore so that the wellbore trajectory can be effectively mapped along its entire trajectory as a function of measured well depth, true vertical well depth, deviation and trajectory. In addition, earth locator 18 tracks the well path and creates a well survey that may be reported to government agencies and/or provides a permanent record as to the physical location of the well in the earth. In order to determine the location data, earth locator 18 is equipped with one or more sensors such as, for example, a gyro or accelerometer. However, other sensors may be utilized also as would be understood by those ordinarily skilled in the art having the benefit of this disclosure. Once the past and real-time location data has been determined by earth locator 18, the data is transmitted back to CPU guidance system 12 to assist with self-correction of SGG assembly 10 to control the well path.

SGG assembly 10 further includes an imaging tool 20 having one or more image sensors to determine the fracture density and/or wellbore stability of the formation surrounding SGG assembly 10. Exemplary imaging tools may be, for example, micro resistivity type tools that require a pad to actually contact the formation (EMI) or sonic imaging tools (AFR) that can create a picture of the bore hole surface. Such exemplary imaging tools can function in the presence of water based or oil based drilling fluids, while the micro resistivity tools typically require the use of a water based drilling fluid. Those ordinarily skilled in the art having the benefit of this disclosure will realize that other sensors may also be utilized. Once the fracture density data is collected by imaging tool 20, it is then transmitted back to CPU guidance system 12 for analysis. Together, the data received from stratigraphic sensing system 16 and imaging tool 20 provide the data necessary for CPU guidance system 12 to determine the physical characteristics of reservoir surrounding SGG assembly 10.

SGG assembly 10 also includes a directional controller 22 which sets the direction for SGG assembly 10 during continuous drilling or other downhole operations. An exemplary directional controller may be, for example, a rotary steering system utilizing a cam mechanism to rotate the internal portion of the tool with respect to the outer portion. As such, the assembly is bent and steered in the desired direction. Those ordinarily skilled in the art having the benefit of this disclosure will realize that other steering assemblies may also be utilized.

As described herein, once CPU guidance system 12 analyzes all the data received from stratigraphic sensing system 16, earth locator 18, and imaging tool 20, the formation characteristic and location data are compared to the formation characteristic and location data of the target well path modeled within the earth modeling module (onboard CPU guidance system 12). Based upon this analysis, CPU guidance system 12 then determines whether SGG assembly 10 is tracking correctly or requires adjustment. If CPU guidance system 12 determines adjustment is necessary, the corresponding signal is transmitted to directional controller 22 in order to steer SGG assembly 10 accordingly. Moreover, utilizing the data received from stratigraphic sensing system 16 and earth locator 18, CPU guidance system 12 verifies that the well is located within the correct part of the formation or reservoir based upon the stratigraphic model, and also provides information as to the exact location of the wellbore within the earth in terms of true vertical depth, measured depth and trajectory in order to create a complete well survey.

In addition, SGG assembly 10 includes a drill bit 24 to drill the well, as understood in the art. In exemplary embodiments of the present invention, drill bit 24 is a "seismic at the bit" sensor that captures reflections and transmits the data to CPU guidance system 12 in order to determine proximity to small or major geologic features, to verify the location of SGG assembly 10, or to establish the location of the wellbore within the stratigraphic system.

Moreover, in exemplary embodiments, the location and formation characteristic data provided by the components of SGG assembly 10 may also be used to update the earth model being analyzed by CPU guidance system 12 in real-time. In other exemplary embodiments, CPU guidance system 12, via the earth modeling module, limits the dogleg severity and maximizes wellbore quality by looking ahead of drill bit 24 using the earth model. Those ordinarily skilled in the art having the benefit of this disclosure will realize that CPU guidance system 12 may be programmed to limit the severity of its directional correction to avoid creating severe dog leg sections within the well.

Figure 2:
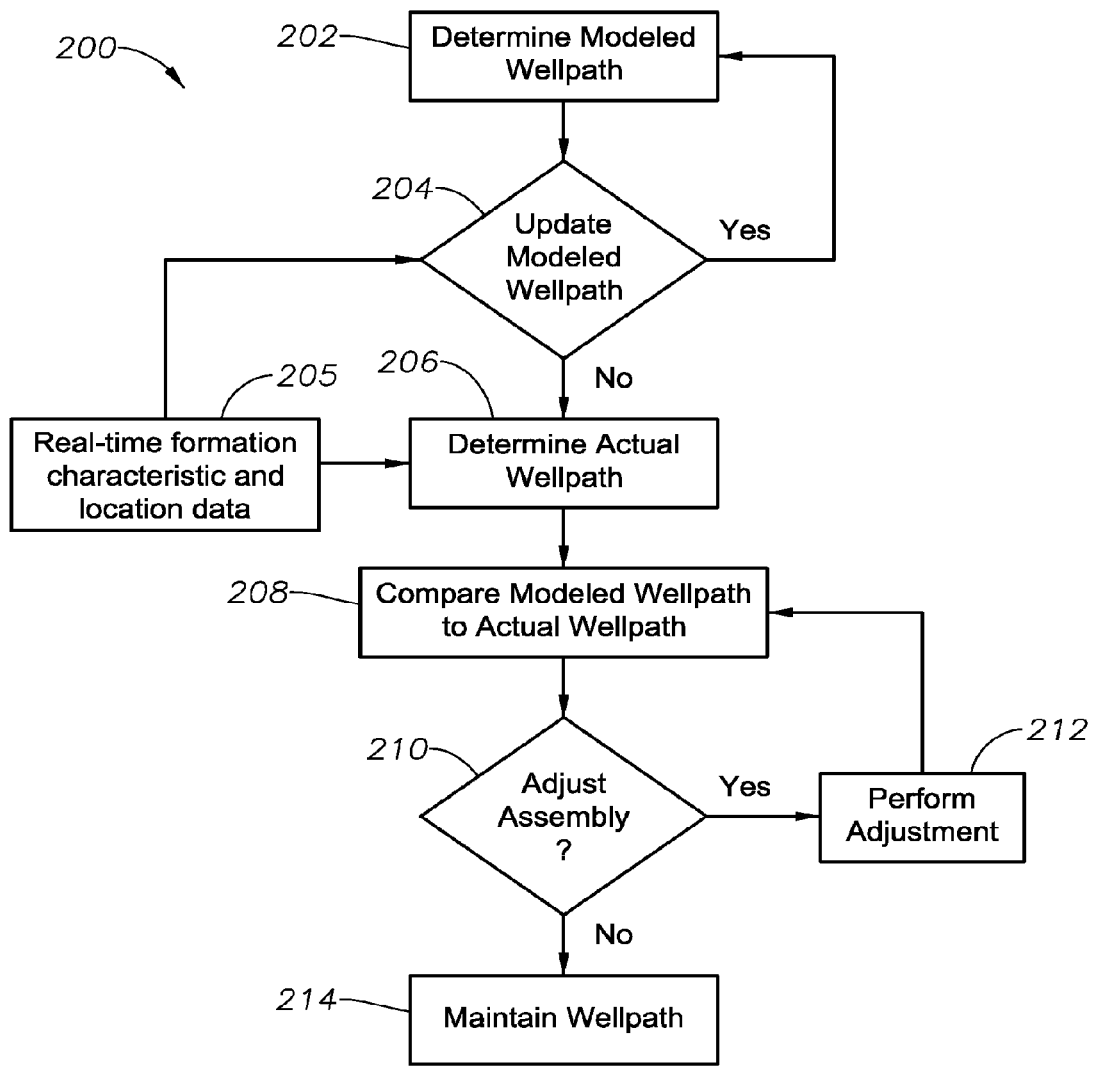
FIG. 2 is a flow chart illustrating an exemplary geosteering methodology of the present invention.

Referring to FIG. 2, operation of the present invention will now be described according to an exemplary methodology 200. At step 202, once SGG assembly 10 is deployed downhole, CPU guidance system, via the earth modeling module, retrieves the modeled formation and well path from system memory, and analyzes it to determine and initiate the modeled well path. At step 204, CPU guidance system 12 determines whether it is necessary to update the modeled well path. In order to do so, CPU guidance system 12 continually monitors the incoming formation characteristic and location data 205 received from the various system components in real-time as previously described, and compares real-time data 205 to the data corresponding to the modeled well path. As such, CPU guidance system 12 then determines if the reservoir model (e.g., formation characteristics and target location) should be updated. If updating is necessary, the algorithm utilized by CPU guidance system 12 loops back to step 202 and remodels the well path accordingly. However, if CPU guidance system 12 determines that no updating is necessary, the algorithm advances to step 206.

At step 206, CPU guidance system 12 then determines the actual well path of SGG assembly 10 utilizing real-time data 205. At step 208, CPU guidance system 12 compares the actual well path to the modeled well path. Thereafter, at step 210, CPU guidance system 12 determines whether SGG assembly 10 requires adjustment. If the determination is "yes," CPU guidance system 12 sends a corresponding signal to directional controller 22 to adjust SGG assembly 10, thereby self-correcting itself at step 212. Thereafter, the algorithm loops back to step 206 where, again, CPU guidance system 12 determines the actual well path of SGG assembly 10 and the analysis continually iterates. However, if at step 210, CPU guidance system 12 determines that no adjustment is necessary, the current well path of SGG assembly 10 is maintained (step 214) until real-time data 205 or some other signal/data is received (from the surface, for example) that requires assembly adjustment. Thereafter, CPU guidance system 12 continually monitors real-time data 205 to determine whether the modeled well path requires updating (step 204) as necessary.

Although the exemplary embodiments are described herein in relation to a drilling assembly, the self-guided geosteering assembly may also be utilized in a variety of other applications. For example, the present invention may be utilized in coiled tubing or workover strings to geosteer the workstring into the correct lateral during workovers in complex multi-lateral wellbores. The present invention may also be utilized to identify and open or close down hole valves, chokes or other production systems when deployed on slickline, wireline, coiled tubing or a work string. In these exemplary applications, the CPU guidance system would be programmed with a detailed wellbore schematic and instructions (for example, earth models, work-flow related algorithms, etc.) of the required activities. Accordingly, these and other applications will be apparent to those ordinarily skilled in the art having the benefit of this disclosure.

An exemplary embodiment of the present invention provides a downhole assembly comprising processing circuitry to geosteer the downhole assembly, the processing circuitry performing a method comprising determining a modeled well path of the downhole assembly through a formation, determining an actual well path of the downhole assembly through the formation, comparing the modeled well path to the actual well path of the downhole assembly and adjusting the actual well path of the downhole assembly as necessary to correspond to the modeled well path of the downhole assembly. In another embodiment, determining the modeled well path further comprises analyzing formation characteristic data corresponding to the formation surrounding the downhole assembly, analyzing location data corresponding to at least one of a location of the formation surrounding the downhole assembly or a location of the downhole assembly and updating the modeled well path of the downhole assembly based upon the formation characteristic data and the location data.

In yet another exemplary embodiment, determining the actual well path further comprises analyzing formation characteristic data corresponding to the formation surrounding the downhole assembly and analyzing location data corresponding to at least one of a location of the formation surrounding the downhole assembly or a location of the downhole assembly, wherein the actual well path is determined based upon the formation characteristic data and the location data. In yet another, adjusting the actual well path of the downhole assembly is performed in real-time. In another, adjusting the actual well path of the downhole assembly is performed without surface intervention. In another, determining the modeled well path of the downhole assembly further comprises creating the well path in a geo cellular earth model. In yet another, adjusting the actual well path of the downhole assembly further comprises adjusting the actual well path of the downhole assembly along a horizontal well. In yet another, the downhole assembly is a drilling assembly.

An exemplary methodology of the present invention provides a geosteering method for a self-guided downhole assembly positioned within a formation, the method comprising determining a modeled well path of the downhole assembly through the formation, determining an actual well path of the downhole assembly through the formation, comparing the modeled well path to the actual well path of the downhole assembly and adjusting the actual well path of the downhole assembly as necessary to correspond to the modeled well path of the downhole assembly. In another, determining the modeled well path further comprises analyzing formation characteristic data corresponding to the formation surrounding the downhole assembly, analyzing location data corresponding to at least one of a location of the formation surrounding the downhole assembly or a location of the downhole assembly and updating the modeled well path of the downhole assembly based upon the formation characteristic data and the location data.

In yet another, determining the actual well path further comprises analyzing formation characteristic data corresponding to the formation surrounding the downhole assembly and analyzing location data corresponding to at least one of a location of the formation surrounding the downhole assembly or a location of the downhole assembly, wherein the actual well path is determined based upon the formation characteristic data and the location data. In yet another, adjusting the actual well path of the downhole assembly is performed in real-time. In another, adjusting the actual well path of the downhole assembly is performed without surface intervention. In yet another, determining the modeled well path of the downhole assembly further comprises creating the well path in a geo cellular earth model. In another, adjusting the actual well path of the downhole assembly further comprises adjusting the actual well path of the downhole assembly along a horizontal well. Yet another further comprises drilling a wellbore utilizing the self-guided downhole assembly.

An exemplary embodiment of the present invention provides a self-guided geosteering assembly comprising a computer guidance system, a stratigraphic sensing tool electrically coupled to the computer guidance system to determine a characteristic of a formation surrounding the geosteering assembly, an earth location tool electrically coupled to the computer guidance system to determine a location of the geosteering assembly and a directional controller electrically coupled to the computer guidance system to steer the geosteering assembly in response to signals received from the computer guidance system. Another exemplary embodiment further comprises a drill bit. In another, the computer guidance system comprises an earth model of the formation. In yet another, the earth model further comprises a horizontal well path of the geosteering assembly. Another further comprises an imaging tool to determine one or more fracture characteristics of the formation surrounding the geosteering assembly.

In yet another, the computer guidance system comprises a processor and a memory operably connected to the processor, the memory comprising software instructions stored thereon that, when executed by the processor, causes the processor to perform a method comprising determining a modeled well path of the downhole assembly through the formation, determining an actual well path of the downhole assembly through the formation, comparing the modeled well path to the actual well path of the downhole assembly and adjusting the actual well path of the downhole assembly as necessary to correspond to the modeled well path of the downhole assembly.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What we claim is:
1. A downhole assembly of a drill string located within a formation for drilling a wellbore through the formation, the downhole assembly comprising processing circuitry to geosteer the downhole assembly as the wellbore is drilled, the processing circuitry performing a method comprising:
   determining a modeled well path of the downhole assembly in a geo cellular model of the formation retrieved from a memory of the downhole assembly;
   analyzing stratigraphic characteristics of the formation surrounding the downhole assembly to identify a stratigraphic location of the downhole assembly as the wellbore is drilled along an actual well path in the formation, based on real-time data collected by stratigraphic sensors of the downhole assembly;
   analyzing location data collected by one or more location sensors of the downhole assembly to track a physical location of the downhole assembly as the wellbore is drilled along the actual well path in the formation;
   analyzing fracture characteristics of the formation surrounding the downhole assembly to determine a fracture density of the formation as the wellbore is drilled along the actual well path, based on real-time data collected by image sensors of the downhole assembly;
   comparing formation characteristics associated with the actual well path of the downhole assembly in the formation with formation characteristics associated with the modeled well path in the geo cellular model, based on the stratigraphic location of the downhole assembly, the physical location of the downhole assembly, and the fracture density of the formation;

adjusting the actual well path of the downhole assembly as necessary to correspond to the modeled well path of the downhole assembly, based on the comparison; and steering the downhole assembly to drill the wellbore along the adjusted well path through the formation.

2. A downhole assembly as defined in claim 1, further comprising:

analyzing formation characteristic data corresponding to the formation surrounding the downhole assembly; and updating the modeled well path of the downhole assembly based upon the formation characteristic data and the location data.

3. A downhole assembly as defined in claim 1, wherein the stratigraphic sensors are part of a stratigraphic sensing system of the downhole assembly and analyzing stratigraphic characteristics comprises analyzing formation characteristic data collected by the stratigraphic sensing system of the downhole assembly along the actual well path through the formation, the formation characteristic data corresponding to a stratigraphic layer of the formation surrounding the downhole assembly, wherein the one or more location sensors are part of an earth location tool of the downhole assembly and analyzing location data comprises analyzing location data collected by the earth location tool of the downhole assembly along the actual well path through the formation, the location data corresponding to the physical location of the downhole assembly, wherein analyzing fracture characteristics comprises analyzing fracture density data collected by an imaging tool of the downhole assembly along the actual well path through the formation, the fracture density data corresponding to the formation surrounding the downhole assembly, and wherein the actual well path is determined based upon the fracture density data, the formation characteristic data, and the location data.

4. A downhole assembly as defined in claim 1, wherein adjusting the actual well path of the downhole assembly is performed in real-time.

5. A downhole assembly as defined in claim 1, wherein adjusting the actual well path of the downhole assembly is performed without surface intervention.

6. A downhole assembly as defined in claim 1, wherein determining the modeled well path of the downhole assembly further comprises creating the modeled well path in the geo cellular model, based on data associated with a target reservoir within the formation, the data including at least one of seismic data, well log data, core data, or basin data.

7. A downhole assembly as defined in claim 1, wherein adjusting the actual well path of the downhole assembly further comprises adjusting the actual well path of the downhole assembly along a horizontal well.

8. A downhole assembly as defined in claim 1, wherein the downhole assembly is a drilling assembly.

9. A geosteering method for a self-guided downhole assembly of a drill string positioned within a formation to drill a wellbore through the formation, the method comprising:

determining, by a computer guidance system of the downhole assembly, a modeled well path of the downhole assembly in a geo cellular model of the formation retrieved from a memory of the downhole assembly;

analyzing, by the computer guidance system, stratigraphic characteristics of the formation surrounding the downhole assembly to identify a stratigraphic location of the downhole assembly as the wellbore is drilled along an actual well path in the formation, based on real-time data collected by stratigraphic sensors of the downhole assembly;

analyzing, by the computer guidance system, location data collected by one or more location sensors of the downhole assembly to track a physical location of the downhole assembly as the wellbore is drilled along the actual well path in the formation;

analyzing, by the computer guidance system, fracture characteristics of the formation surrounding the downhole assembly to determine a fracture density of the formation as the wellbore is drilled along the actual well path, based on real-time data collected by image sensors of the downhole assembly;

comparing, by the computer guidance system, formation characteristics associated with the actual well path of the downhole assembly in the formation with formation characteristics associated with the modeled well path in the geo cellular model, based on the stratigraphic location of the downhole assembly, the physical location of the downhole assembly, and fracture density of the formation;

adjusting, by a directional controller of the downhole assembly, the actual well path of the downhole assembly as necessary to correspond to the modeled well path of the downhole assembly, based on the comparison by the computer guidance system; and steering, by the directional controller, the downhole assembly to drill the wellbore along the adjusted well path through the formation.

10. A geosteering method as defined in claim 9, further comprising:

analyzing formation characteristic data corresponding to the formation surrounding the downhole assembly; and updating the modeled well path of the downhole assembly based upon the formation characteristic data and the location data.

11. A geosteering method as defined in claim 9, wherein the stratigraphic sensors are part of a stratigraphic sensing system of the downhole assembly and analyzing stratigraphic characteristics comprises analyzing formation characteristic data collected by the stratigraphic sensing system of the downhole assembly along the actual well path through the formation, the formation characteristic data corresponding to a stratigraphic layer of the formation surrounding the downhole assembly, wherein the one or more location sensors are part of an earth location tool of the downhole assembly and analyzing location data comprises analyzing location data collected by the earth location tool of the downhole assembly along the actual well path through the formation, the location data corresponding to the physical location of the downhole assembly, wherein analyzing fracture characteristics comprises analyzing fracture density data collected by an imaging tool of the downhole assembly along the actual well path through the formation, the fracture density data corresponding to the formation surrounding the downhole assembly, and wherein the actual well path is determined based upon the fracture density data, the formation characteristic data, and the location data.

12. A geosteering method as defined in claim 9, wherein adjusting the actual well path of the downhole assembly is performed in real-time.

13. A geosteering method as defined in claim 9, wherein adjusting the actual well path of the downhole assembly is performed without surface intervention.

14. A geosteering method as defined in claim 9, wherein determining the modeled well path of the downhole assembly further comprises creating the modeled well path in the geo cellular model, based on data associated with a target reservoir within the formation, the data including at least one of seismic data, well log data, core data, or basin data.

15. A geosteering method as defined in claim 9, wherein adjusting the actual well path of the downhole assembly further comprises adjusting the actual well path of the downhole assembly along a horizontal well.

16. A geosteering method as defined in claim 9, further comprising drilling a wellbore utilizing the self-guided downhole assembly.

17. A self-guided geosteering assembly comprising:
a computer guidance system;
a stratigraphic sensing tool electrically coupled to the computer guidance system to determine a characteristic of a formation surrounding the geosteering assembly;
an earth location tool electrically coupled to the computer guidance system to determine a location of the geosteering assembly; and
a directional controller electrically coupled to the computer guidance system to steer the geosteering assembly in response to signals received from the computer guidance system.

18. A geosteering assembly as defined in claim 17, further comprising a drill bit.

19. A geosteering assembly as defined in claim 17, wherein the computer guidance system comprises an earth model of the formation.

20. A geosteering assembly as defined in claim 19, wherein the earth model further comprises a horizontal well path of the geosteering assembly.

21. A geosteering assembly as defined in claim 17, further comprising an imaging tool to determine one or more fracture characteristics of the formation surrounding the geosteering assembly.

* * * * *